US006976608B2

(12) United States Patent
Ichikawa et al.

(10) Patent No.: US 6,976,608 B2
(45) Date of Patent: Dec. 20, 2005

(54) CARTRIDGE CHARGED WITH FLUID MATERIALS AND DEVICE FOR LOADING SUCH CARTRIDGE TO FLUID DISPENSING APPARATUSES

(75) Inventors: Tooru Ichikawa, Chiyoda-ku (JP); Youji Tanaka, Kawasaki (JP)

(73) Assignees: Hosokawa Yoko Co., Ltd., (JP); Kabushiki Kaisha Polymer Systems, (JP)

( * ) Notice: Subject to any disclaimer, the term of this patent is extended or adjusted under 35 U.S.C. 154(b) by 0 days.

(21) Appl. No.: 11/056,126

(22) Filed: Feb. 14, 2005

(65) Prior Publication Data

US 2005/0139616 A1 Jun. 30, 2005

Related U.S. Application Data

(62) Division of application No. 10/197,894, filed on Jul. 19, 2002, now Pat. No. 6,892,908.

(51) Int. Cl.[7] ......................... G01F 11/00; B65D 35/56
(52) U.S. Cl. ....................................... 222/325; 222/105
(58) Field of Search ................................ 222/325–327, 222/95, 105

(56) References Cited

U.S. PATENT DOCUMENTS

| | | | | |
|---|---|---|---|---|
| 1,953,765 | A | 4/1934 | McCluney | 220/366.1 |
| 2,991,138 | A | 7/1961 | Eschmann | 215/356 |
| 3,999,680 | A | 12/1976 | Cho | 220/366.1 |
| 5,088,630 | A * | 2/1992 | Arch et al. | 222/326 |
| 5,139,178 | A * | 8/1992 | Arch et al. | 222/326 |
| 5,301,835 | A | 4/1994 | Fulks et al. | 222/95 |
| 5,301,839 | A | 4/1994 | Eierle et al. | 222/95 |
| 6,176,396 | B1 | 1/2001 | Hamada et al. | 222/137 |
| 6,513,680 | B2 * | 2/2003 | Nakayoshi et al. | 222/1 |

* cited by examiner

*Primary Examiner*—Kevin Shaver
*Assistant Examiner*—Stephanie Willatt
(74) *Attorney, Agent, or Firm*—Steptoe & Johnson LLP

(57) ABSTRACT

A cartridge-loading device is provided, to which a cartridge charged with a fluid material is loaded. The device comprises a cylindrical device body, piston, and nozzle. Both ends of the device body are opened to provide a bore therethrough. The cartridge is inserted into the bore. A notch is formed at an end portion of the device body. The piston, which is slidably arranged in the bore, is used for pushing the cartridge for ejecting the fluid material. The nozzle is detachably fitted into the opening of one end of the device body. The one end is located oppositely to the piston and have the notch formed thereat. Further, the cartridge has a cartridge body covered tightly by a cover member having one end protrude from an end of the cartridge body on an ejecting side thereof.

1 Claim, 3 Drawing Sheets

CARTRIDGE CHARGED WITH FLUID MATERIALS AND DEVICE FOR LOADING SUCH CARTRIDGE TO FLUID DISPENSING APPARATUSES

This application is a division of application Ser. No. 10/197,894 filed Jul. 19, 2002, now U.S Pat. No. 6,892,908.

BACKGROUND OF THE INVENTION

1. Technical Field

The present invention relates to a cartridge charged with fluid materials, such as adhesive and sealant, and a cartridge-loading device for mounting such cartridge to fluid dispensing apparatuses (for example, a dispensing gun) capable of dispensing the fluid materials.

2. Related Art

Cartridges charged with fluid materials, such as adhesive and sealant, have a variety of kinds of practical applications.

Usually, a cartridge is mounted to fluid dispensing apparatuses with the aid of a device to load the cartridge thereto. Such device is known as a "loading device." This loading device, in general, is equipped with a cylindrical device body of which both end sides are opened to form individual openings, a piston, and a nozzle. The piston is located inside the device body so as to be slidable along a bore of the device body. The nozzle is detachably attached to one of the openings of the device body.

The cartridge is provided with a cylindrical cartridge body made of a membrane. The opening of each end of the cartridge body is sealed by binding its end portion with the use of, for example, a relatively thin wire composing sealing means. The cartridge body is charged with a desired fluid material before the completion of sealing both ends of the cartridge body.

For loading the cartridge to the loading device, the piston is first pushed back sufficiently toward one of both ends in order to accept the cartridge entirely into the device body. The device body is placed to stand, and the cartridge is inserted into the bore of the device body from its upper opening. After the insertion, the upper end of the cartridge, which is on opposite side to the piston, is cut out by for example scissors at an inner position than the sealing means to form an opening. The nozzle is then forcibly fit into the other end of the device body, before the loading device is loaded onto a fluid dispensing apparatus such as a dispensing gun.

A rod of the dispensing apparatus is operated to push the piston toward the nozzle, with the result that the cartridge begins to be squeezed in turn from the piston side thereof in an accordion-like form. This squeezing operation allows the fluid material contained in the cartridge to be pushed out through the opening thereof, resulting in that the material is dispensed out of the nozzle.

When the whole cartridge has been squeezed, that is, the cartridge has been used up, it is possible to exchange the cartridge for a new one by removing the squeezed cartridge from the device body. This removal is achieved by removing the nozzle from the cartridge body, in which the squeezed cartridge forcibly sticks to the nozzle. That is, the cartridge is automatically pulled out, together with pulling of the nozzle, from the device body.

After completing the removal of the squeezed cartridge from the device body, a new cartridge is loaded to the loading device so that the fluid material can be dispensed again.

It is usual, as above, that the removal of the nozzle causes the cartridge to be pulled out from the device body as well, because the cartridge is made to forcibly stick to the inside of the nozzle. However, such a case is not always true. Specifically, there are some occasions where the outer surface of the squeezed cartridge tightly comes in contact with the inner wall surface of the device body. Hence a space partitioned by both of the cartridge and the nozzle within the bore of the device body is shielded in an airtight manner. In such a situation, when pulling the cartridge from the device body together with the nozzle gives rise to a negative pressure in the space partitioned by both of the cartridge and the nozzle. This negative pressure operates to pull back the cartridge toward the piston, resulting in that the cartridge is often left alone in the device body, not pulled out together with the nozzle operated by hands.

If such an occasion occurs, the cartridge should be pulled out again after having pulled out the nozzle. Pulling the cartridge out forces an operator to grip the nozzle-side end of the cartridge with operator's fingers, although the nozzle-side end thereof has been dirty with the fluid material. Therefore, manually pulling the cartridge that remained within the device body will lead to a problem that operator's hands become dirty with the fluid material.

In addition, the foregoing conventional cartridge has a problem that the fluid material is easier to spill over during loading work of the cartridge to the loading device. Specifically, when it is requested for an operator that the upper end of the cartridge be cut out to form an opening, it is considerably difficult for the operator to realize the cutting work without a spill of the fluid material charged within the cartridge. When such a spill occurs, the device body or an operator's hand will get dirty with the spilled fluid material.

SUMMARY OF THE INVENTION

The present invention has been made with due consideration to the foregoing drawbacks, and a first object of the present invention is to provide a device for loading a fluid-material cartridge to a fluid dispensing apparatus, which is able to securely pull out the cartridge, together with a nozzle, from the device body of the loading device, that is, prevent the cartridge from being left in the device body alone, in cases where the nozzle is removed from the device body.

A second object of the present invention is to provide a cartridge that has capability of preventing a fluid material from spilling over during loading work of the cartridge to a loading device.

In order to attain the above first object, the present invention provides, as one aspect, a cartridge-loading device comprising: a cylindrical device body of which both ends are opened so as to provide a bore therethrough, a cartridge charged with a fluid material being inserted into the bore, a notch being formed at an end portion of the device body; a piston slidably arranged in the bore of the device body with the inserted cartridge located thereby, the piston being used for pushing the cartridge for ejection of the fluid material; and a nozzle detachably fitted into the opening of one of both ends of the device body and formed to forcibly but detachably be coupled to an end of the cartridge to be pressed gradually, the one end being located oppositely to the piston and having the notch formed thereat.

As a result, when the cartridge has been used up (i.e., the cartridge has been squeezed to its minimum size in an accordion form), an operator can use the notch to remove the nozzle from the device body. This facilitates the operator's pulling operation of the nozzle from the device body.

In addition, when pulling out the nozzle, the notch is able to introduce air from the outside to an inner space between the cartridge and the piston. Introducing the air prevents the space from being subject to negative pressure. Thus, it can easily be done that the cartridge is removed from the device body with the cartridge sticking to the nozzle (that is, the tip of the cartridge can be fit into an inner space of the nozzle by pressure given by squeezing the cartridge during the use thereof). That is, in most cases, it can be avoided a situation that only the cartridge is left in the bore of the device body when the nozzle is pulled out from the device body. Therefore, it is not necessary for the operator to pull out again only the cartridge that has been dirty with the fluid.

Preferably, the notch consists of a plurality of notches formed at the end separately from each other in a circumferential direction of the end. It is also preferred that each of the notches is formed to have a longer length than an inserted length of the nozzle into the end of the device body in an axial direction of the device body. By way of example, the notch may be formed at each of both the ends of the device body so as to allow the nozzle to detachably be inserted into each end.

In order to attain the above second object, the present invention provides, as a further aspect, a cartridge charged with a fluid material, comprising: a cartridge body for containing the fluid material therein, the cartridge body having an end at which an opening is formed to eject the fluid material through the opening; and a cover member tightly covering the cartridge body and having at least one end located to protrude from the end of the cartridge body.

Because the cover member forms the one end located so as to protrude from the end of the cartridge body, the fluid material that has spilled from holes drilled in the end of the cartridge body is prevented from being spilled out of the cover member, that is, the cartridge. Therefore, there is almost no fear that operator's fingers will get dirty with the fluid when inserting the cartridge to the cartridge-loading device and drilling ejection holes in the end of the inserted cartridge.

It is preferable that he cartridge body is shaped into a cylinder and the one end of the cover member is shaped into an approximate cylinder smaller in diameter than a diameter of the cartridge body. It is still preferred that the cover member is made of a material with thermal shrinkage, a thermal shrinkage treatment being applied to the cover member so as to tightly cover the cartridge body and to form the one end thereof. Preferably, the cartridge is loaded to a device to be mounted to a fluid dispensing apparatus and to be connected to a nozzle at one end of the device, and the one end of the cover member has a tip of which outer diameter is slightly smaller than an inner diameter of the nozzle.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, preferred embodiments of the present invention will now be described.

(First Embodiment)

Referring to FIGS. 1 to 6, a first embodiment of the present invention will now be described. The first embodiment features a loading device of a cartridge containing a fluid material.

Figure 1:
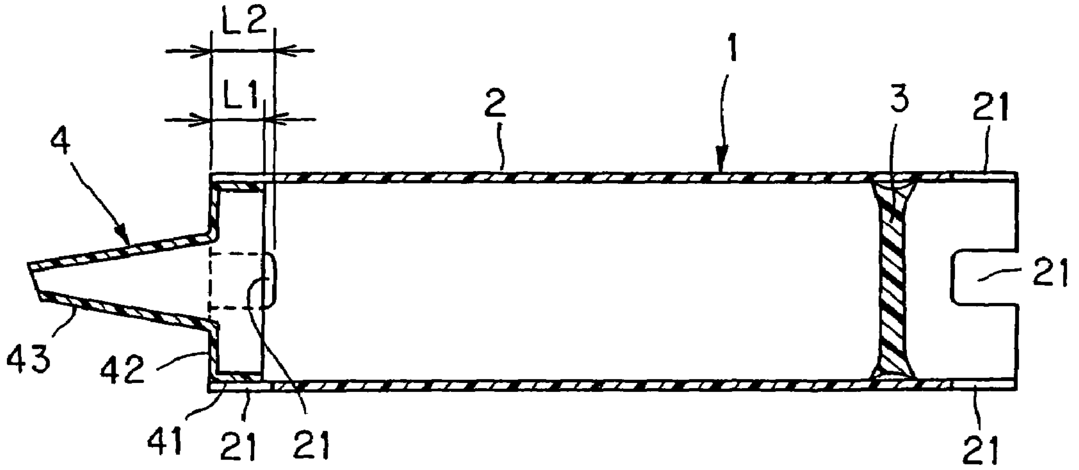
FIG. 1 is a cross section showing one embodiment a cartridge-loading device according to the present invention.

FIG. 1 shows a cartridge-loading device 1 to be mounted on a fluid dispensing apparatus, where the device is manufactured according to the principle of the present invention. The cartridge-loading device 1 is provided with a device body 2, a piston 3, and a nozzle 4, as shown in FIG. 1.

The device body 2, which is made of relatively hard resin, is composed of a cylinder of which ends are open and each of outer and inner radiuses is constant entirely over its axial direction. At each of both ends of the device body 2, notches 21 are formed. By way of example, the number of notches 21 is plural at each end, where the notches 21 are located around each end at equal intervals in the circumferential direction. In the present embodiment, an even number of notches 21 are formed, so that paired notches 21, which are located at intervals of 180 degrees in the circumferential direction of the device body 2, are directly faced to each other with a central axial line therebetween. An alternative configuration is that only one notch 21 is formed at each end of the device body 2. A further alternative is to use a plurality of notches located at unequal intervals in the circumferential direction.

The piston 3 is made of a relatively hard resin and shaped into a disk form. The piston 3 is disposed within a bore of the device body 2 in such a manner that the piston 3 is moved in a slidable manner along the inner wall between two initial positions. In cases where the piston 3 is located at one initial position near one end of the device body 2, the initial position is distant a predetermined length from the edge of the one end. The device body 2 is formed such that the remaining space partitioned by the piston 3 in the bore of the device body 2 accepts the whole of a cartridge 5, which will be described later.

Figure 4:
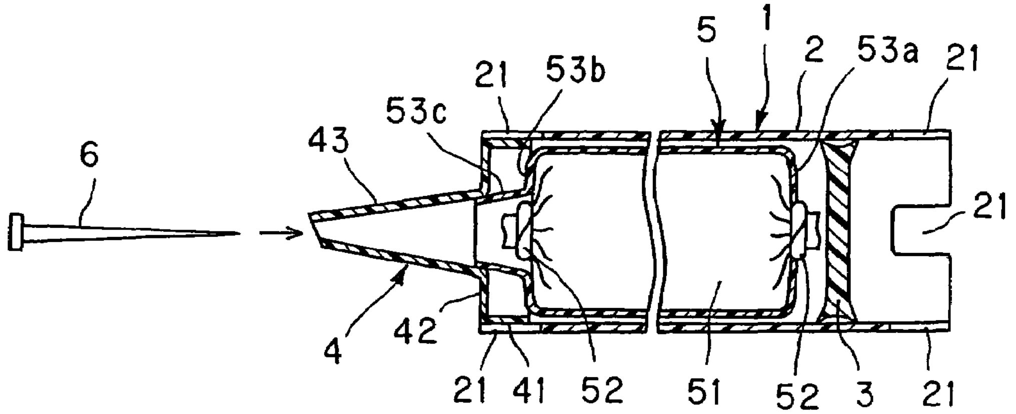
FIG. 4 illustrates, in a partial cross section, an assembly in which the cartridge-loading device is loaded with the cartridge.
Figure 5:
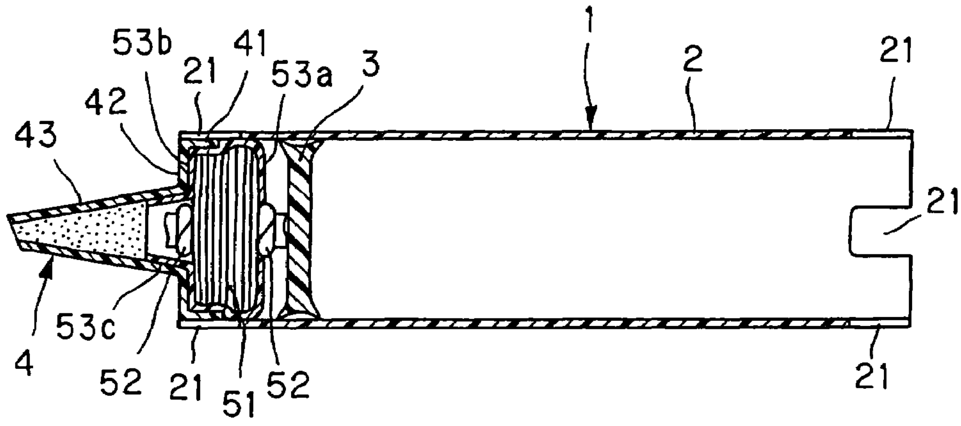
FIG. 5 is a cross section showing the cartridge-loading device loaded with the cartridge, in which the cartridge has been used up.

For example, as shown in FIGS. 1 and 4, it is supposed that the piston 3 is located at an initial position near the right end of the device body 2. It this case, the whole cartridge 5 can be inserted in the space residing on the left side of the piston 3 in the bore of the device body 2. The piston 3 is moved leftward from this right-side position until the cartridge be used up (that is, until the whole cartridge 5 is squeezed, as shown in FIG. 5), the piston 3 is located at the other initial position near to the left end of the device body 2. The piston 3 has been moved to the leftward initial position (in this case, the cartridge 5 has been squeezed completely), a different new cartridge 5 can be accommodated entirely in a remaining space on the right side of the piston 3 in the bore of the device body 2.

The foregoing nozzle 4, which is made of relatively hard resin, is formed to have a short device portion 41, a base 42 integrally coupled with the device portion 41, and a nozzle body 43 integrally coupled with the base 42. Accordingly, the nozzle body 43 communicates with the device portion 41. The device portion 41 is formed to have an outer diameter slightly larger than the inner diameter of the device body 2, but each of the device body 2 and the device portion 41 can slightly be enlarged or contracted in diameter in an elastic manner. It is therefore possible that the device portion 41 is detachably fitted into the bore of the device body 2. An alternative configuration is that an end of the device body 2 may detachably be fitted into the device portion 41. The nozzle 43 is built at substantial center of the base 42 and gradually becomes smaller in diameter from the root to the tip.

As shown in FIG. 1, the device portion 41 has an axial length L1 slightly larger than a cut length L2 of each notch 21. In the case that the device portion. 41 is entirely fitted into one of both the openings of the device body 2, the outer surface of the base 42 can be located to form a common surface to the edge of one end of the device body 2. In this fit situation, a portion of each notch 21, which is covered by the length L1 from the edge of the end of the device body 2, is shielded by the device portion 41.

By contrast, the remaining end portion of each notch 21, which is located on its rear side thereof, is not covered by the device portion 41 so as to form an opening of which size corresponds to a difference between the lengths L1 and L2. Thus this opening serves as a though hole between the inside and outside of the device body 2. This makes it possible that an inner space partitioned by both the piston 3 and the nozzle 4, which is within the bore of the device body 2, to communicate with the outside thereof, even after the device portion 41 is fit into the device body 2.

Figure 2:
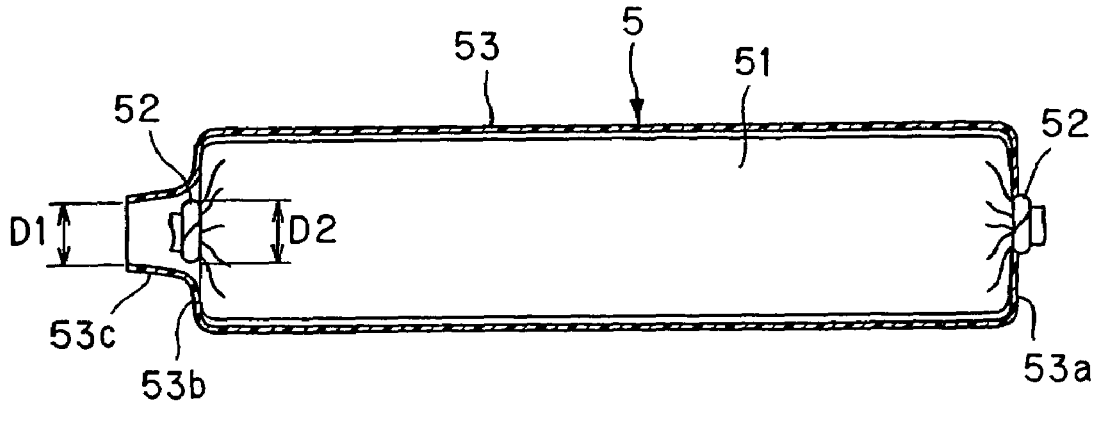
FIG. 2 is a cross section exemplifying a cartridge mounted to a fluid dispensing apparatus with use of the loading device shown in FIG. 1.
Figure 3:
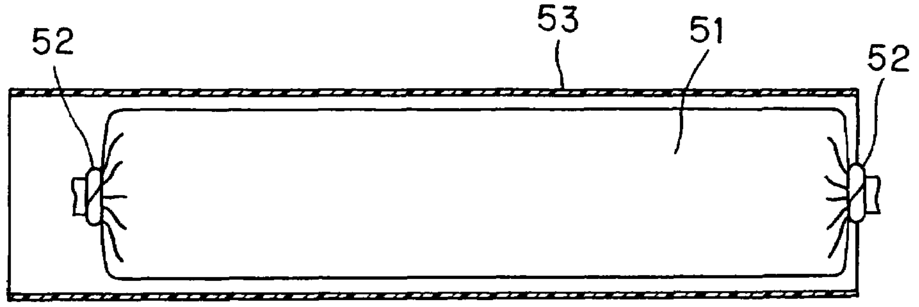
FIG. 3 illustrates, in a cross section, the cartridge before being subject to thermal shrinkage.

FIG. 2 explains a cartridge 5 to be mounted to various kinds of fluid dispensing apparatuses including a fluid-dispensing gun, which requires the foregoing cartridge-loading device 1. The cartridge 5 includes a cartridge body 51 and a cylindrical cover member 53.

The cartridge body 51 is formed into a cylinder (circular in section) of which both ends are opened and composed of a single resin film or a plurality of thin membranes formed of a single or plural layers and metal foils. Each of both ends of the cartridge body 51 can be closed by a sealing member 52, serving as sealing means, made of a relatively thin metal wire, so that the inside of the cartridge body 51 are charged with fluid materials, such as adhesive or sealing material.

Normally, the sealing member 52 is first attached to one end opening of the cartridge body 51, a fluid material is charged into the cartridge body 51, and the sealing member 52 is added to the other end opening of the cartridge body 51. As a modification, there is a cartridge body provided with an integrally formed bottom at its one end, but of which remaining end is still opened. If a fluid material can be charged, a cartridge body may be formed with its both ends bottomed.

The cylindrical cover member 53 is placed around the outer surface of the cartridge body 51. The cylindrical cover member 53, which is made of materials with a thermal shrinkage performance, is formed to have, before a thermal shrinkage treatment, an inner diameter slightly larger than the outer diameter of the cartridge body 51. This makes it easier to insert the cartridge body into the cover member 53. But the cylindrical cover member 53 is able to have a contacted diameter less than that of the cartridge body 51 after the thermal shrinkage treatment. In addition, the entire length of the cylindrical cover member 53 is set to be longer than that of the cartridge body 51.

Hence, the cylindrical cover member 53 can be placed around the cartridge body 51 so as to not only make one end thereof (the right end in FIG. 3; hereafter referred to as a “first end”) protrude slightly from one end of the cartridge body 51 but also make the other end thereof (the left end in FIG. 3; hereafter referred to as a “second end”) protrude largely from the other end of the cartridge body 51.

As a result, when the cylindrical cover member 53 is subjected to thermal shrinkage, a main part of the member 53 is fitted tightly around the outer circumferential surface of the cartridge body 51, as illustrated in FIG. 2. In addition, the thermal shrinkage treatment allows the first end of the cartridge body 51 to contract in diameter so that its end is bent along the shape of one side of the cartridge body 51, thereby providing a regulating end 53*a* to stop a movement of the cartridge body 51.

On the other hand, the thermal shrinkage treatment allows only a root potion of the second end of the cartridge body 51 to contract in diameter so that such root portion is bent along the shape of the other side of the cartridge body 51. Thus, such bending provides a second regulating end 53*b*, like the foregoing regulating end 53*a*. Since the two regulating ends 53*a* and 53*b* regulate both the positions of the cartridge body 51 from both ends facing to each other, the cylindrical cover member 53 is fixed to the cartridge body 51.

Of the second end of the cylindrical cover member 53, the remaining tip-side portion apart from the root portion, which is also apart from the end of the device body 2, is made to contract freely, due to the thermal shrinkage treatment, to a small-diameter cylindrical portion 53*c* whose diameter is a possible minimum size. This small-diameter cylindrical portion 53*c* is formed to protrude by a predetermined length or more from the end of the cartridge body 51 and to have an inner diameter D1 slightly larger than the outer diameter D2 of the sealing member 52. The outer diameter of the small-diameter cylindrical portion 53*c* is equal or slightly less to or than the inner diameter of a root portion of the nozzle body 43.

For using the cartridge-loading device 1 to make the cartridge 5 expense a fluid material, the piton 3 is previously moved to locate at one of the two initial positions near both ends of the device body 2 or at a position nearer to each end than each initial position. The cartridge 5 is then inserted, with the bottom-side regulating end 53*a* ahead, into the device body 2 through the other end opening opposite to the piston 3.

When the top of the cartridge 5 reaches the piston 3, the whole cartridge 5 is hidden into the device body 2. And the tip of the small-diameter cylindrical portion 53*c* becomes almost the same level as the edge of the other end of the device body 2, which is opposite to the piston 3. This positioning is allowed by adjusting the axial length of the device body 2.

The nozzle 4 is then fixed to the device body 2 by forcibly inserting its device portion 41 into the other end of the device body 2 so that the outer surface of the base 42 becomes the same level as the edge of the other end of the device body 2. Because the small-diameter cylindrical portion 53*c* has a predetermined length as described above, the tip of the portion 53*c* is obliged to be inserted slightly into the inner bore of the root portion of the nozzle body 43.

After this fixing operation, a needle-like member 6, such as a bodkin, is inserted through the bore of the nozzle body 43 to drill holes (punctures) into the end side of the cartridge body 51. The holes are in charge of ejecting the fluid material from the cartridge body 51. Hence the number of holes and the size of each hole can be determined properly in compliance with a desired amount of the fluid material to be ejected.

The forgoing holes may be drilled before the nozzle 4 is fitted into one end of the device body 2. In such a case, it is preferred that the device body 2 is stood so that the small-diameter cylindrical portion 53*c* is directed upward. Hence the needle-like member 6 can be inserted downward through the cylindrical portion 53*c* in order to drill the holes in the side of the cartridge body 51.

In any case, drilling the holes by using the needle-like member 6 will cause the fluid material to spill from the cartridge body 51. But the end of the cartridge body 51 is surrounded by the protruding small-diameter cylindrical portion 53*c*, with the result that the material that has spilled out from the cartridge body 51 still remains within the cylindrical portion 53*c*, without spilling out of the cartridge. Accordingly, the fluid material that has spilled out can be avoided from polluting the device body 2 and operator's hands.

Particularly, as described in the present embodiment, when the hole are drilled in the cartridge body 51 with the nozzle 4 mounted to the device body 2, the fluid that has spilled out remains inside the nozzle body 43, without being ejected outside, because the nozzle body 43 is fitted into the small-diameter cylindrical portion 53*c*. Thus, adhesion of the fluid material to the device body 2 and operator's hands can be prevented with more steadiness.

The cartridge-loading device 1 is mounted to a fluid dispensing apparatus (for instance, a fluid dispensing gun), through not shown. The fluid dispensing apparatus has a rod to push the piston 3 toward the nozzle 4. In the beginning of the push, the cartridge 5 is allowed to move toward the nozzle 4, but when the tip-side regulating end 53*b* strikes the bottom 42 of the nozzle 4, the cartridge 5 is no longer able to move forward. As a result, the cartridge 5 is forced to be squeezed little by little from the piston-side end thereof so as to form an accordion-like body, responsively to the advancement of the push.

Since the outer circumferential surface of the cartridge body 51 is tightly covered by the cylindrical cover member 53, a situation can be prevented that the membrane composing the cartridge body 51 is bit between the inner wall of the device body 2 and the outer circumferential surface of the piston 3.

The squeezed cartridge body 51 causes the fluid material to be compulsory ejected through the drilled holes thereof in reply to the squeezed cartridge body 51. The ejected fluid material is supplied from the nozzle 43.

Incidentally, when the piston 3 pushes the cartridge 5, this push leads to the nozzle 4, because a pushing force is transmitted through the cartridge 5. However, since the fluid dispensing apparatus is able to stop a further advancement of the base 42 of the nozzle 4, there is no possibility that the nozzle 4 is pulled out from the device body 2.

In the case that the cartridge 5 is squeezed until its shrinkable limit appears, the piston is located at the initial position opposite to its original one. Because this state will occur when the cartridge 5 has been used up, it is required to exchange this cartridge 5 for new one. This replacement first requires that the nozzle 4 be pulled out from the device body 2. Since the plural notches are formed face to face at each end of the device body 2, fingers can touch the facing notches 21 and 21 in order to grip the device portion 41 of the nozzle 4. This grip will facilitate putting the nozzle 4 form the device body 2.

Figure 6:
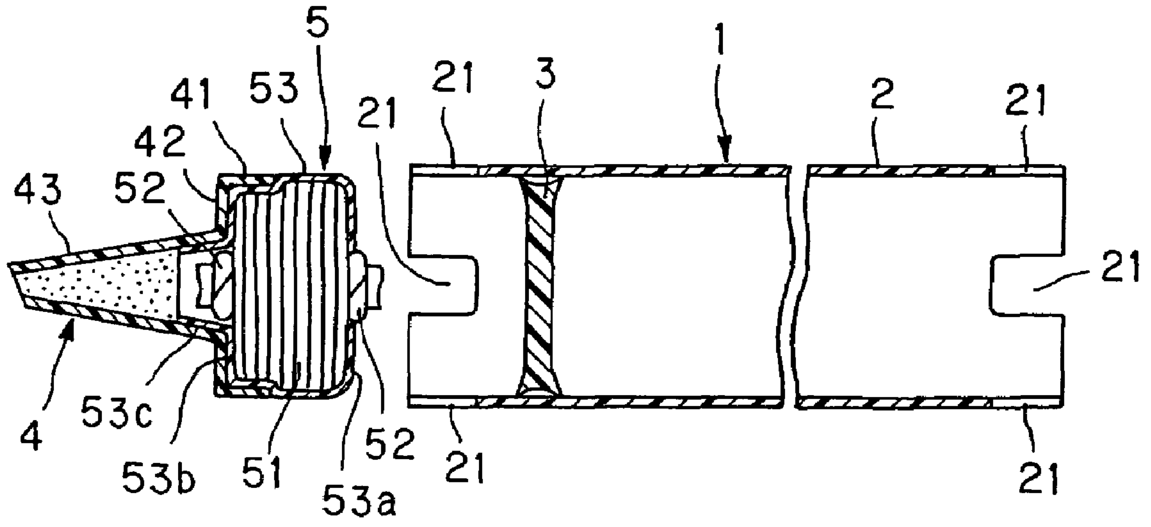
FIG. 6 shows, in cross sections, the cartridge-loading device from which a nozzle and the cartridge are removed.

When the device portion 41 of the nozzle 4 is pulled out from the device body 2, air flows into the space partitioned by both of the cartridge 5 and the pistons from the outside through the notches 21. Thus, in almost cases, the space is securely prevented from becoming negative pressure. Accordingly, as shown in FIG. 6, pulling the nozzle 4 from the device body 2 is always accompanied by the cartridge 5 that has firmly been attached to the nozzle 4 firmly accepting the small-diameter cylindrical portion 53*c* of the cartridge 5. The cartridge 5 that has been pulled out together with the nozzle 4 is then removed from the nozzle 4 and disposed of.

The cartridge 5 can be removed from the nozzle 4 by grasping the end of the cartridge 5 opposite to the nozzle 4. As can be understood from FIG. 6, it is clear that such opposite end of the cartridge 5 is not dirty with the fluid material that was charged in the cartridge body 51. Therefore, the operator who removes the cartridge 5 from the nozzle 4 is free from being dirty with the fluid.

For using again the cartridge-loading device 1, a new cartridge 5 is inserted, with its first end ahead, into the right space of the device body 2 that has been vacant (i.e., the bore on the right of the piston 3 in FIG. 6). And the nozzle 4 is fit into the opening of the end through which the new cartridge 5 has been inserted. Thus, like the above, the new cartridge 5 is also subject to the ejection of the fluid material charged therein.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

For instance, the foregoing embodiment has been described about the configuration in which the notches 21 are formed at each of both ends of the device body 2, but it is possible that such notches 21 are formed at either one end of the device body 2.

A further modification is concerned with the position of arrangement of the cylindrical cover member 53. In the foregoing embodiment, the cylindrical cover member 53 is placed around the outer surface of the cartridge body 51. Hence, before the holes are drilled into the cartridge body 51, it is necessary that the cartridge 5 be inserted into the unit body 5, and then the nozzle 4 is attached to the unit body 2. Alternatively, in cases where a conventional cartridge with no cylindrical cover member 53 is used, the cartridge is first inserted into the device body 2, a nozzle-side end of the cartridge is cut out to form an opening, and the nozzle 4 is finally fit into the device body 2.

A still further modification relates to the cylindrical cover member 53. In the foregoing embodiment, such member 53 is subject to the thermal shrinkage treatment to form the regulating ends 53*a* and 53*b* and the small-diameter cylindrical portion 53*c* at both ends of the device body 2. In place of this configuration, the cylindrical cover member 53 may be formed to have constant inner and outer diameters over its entire axial length, on condition that, at least, one end of the member 53 is placed to protrude from the cartridge body 51. In such a configuration, it is unnecessary to use the foregoing needle-like member 6, and only cutting out one end (on the protruding side) of the cartridge body 51 at a position thereof inner than the sealing member 52 is sufficient to form an aperture in the cartridge body 51.

The entire disclosure of each of Japanese Patent Applications No. 2001-020970 filed on Jan. 30, 2001 and No. 2001-020971 filed on Jan. 30, 2001 including the specification, claims, drawings and summary is incorporated herein by reference in its entirety.

What is claimed is:

1. A cartridge charged with a fluid material, comprising:

a cartridge body for containing fluid material therein, the cartridge body having an end comprising an opening for ejecting fluid material through the opening; and a cover member tightly covering the cartridge body and having at least one end located to protrude from the end of the cartridge body, wherein the cartridge body is cylindrical and the one end of the cover member is substantially cylindrical and has a diameter that is smaller than a diameter of the cartridge body, the cover member comprises a thermal-shrink material thermally shrunk to tightly cover the cartridge body and to form the one end thereof, and the cartridge is loadable into a device for mounting to a fluid dispensing apparatus and for connecting to a nozzle at one end of such device, and the one end of the cover member has a tip having an outer diameter that is slightly smaller than an inner diameter of such nozzle.

* * * * *